United States Patent
Le et al.

(10) Patent No.: US 10,141,844 B2
(45) Date of Patent: Nov. 27, 2018

(54) RECONFIGURABLE POWER REGULATOR

(71) Applicant: Lion Semiconductor Inc., Berkeley, CA (US)

(72) Inventors: Hanh-Phuc Le, Richmond, CA (US); John Crossley, Oakland, CA (US); Wonyoung Kim, Berkeley, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 633 days.

(21) Appl. No.: 14/332,585

(22) Filed: Jul. 16, 2014

(65) Prior Publication Data
US 2015/0022173 A1   Jan. 22, 2015

Related U.S. Application Data

(60) Provisional application No. 61/846,689, filed on Jul. 16, 2013.

(51) Int. Cl.
*H02J 1/00* (2006.01)
*H02J 3/00* (2006.01)
(Continued)

(52) U.S. Cl.
CPC ............... *H02M 3/158* (2013.01); *G05F 1/46* (2013.01); *H02J 3/00* (2013.01); *H02M 3/00* (2013.01)

(58) Field of Classification Search
CPC .... H02M 7/44; H02M 2001/007; H02M 3/04; H02M 2001/0077; H02M 7/7487;
(Continued)

(56) References Cited

U.S. PATENT DOCUMENTS

| | | | |
|---|---|---|---|
| 5,834,925 A | 11/1998 | Chesavage | |
| 7,616,456 B2 * | 11/2009 | Ostrom | G05F 1/613 323/266 |

(Continued)

FOREIGN PATENT DOCUMENTS

| | | |
|---|---|---|
| WO | WO-2012/066807 A1 | 5/2012 |
| WO | WO-2013/032753 A2 | 3/2013 |

OTHER PUBLICATIONS

International Search Report and Written Opinion issued by the European Patent Office as International Searching Authority for International Application No. PCT/US2014/046790 dated May 8, 2015 (17 pages).

(Continued)

*Primary Examiner* — Alfonso Perez Borroto
*Assistant Examiner* — Esayas Yeshaw
(74) *Attorney, Agent, or Firm* — Byrne Poh LLP

(57) ABSTRACT

The present disclosure shows ways to use multiple "integrated voltage regulator (IVR) units" to offer IVRs that can cover a wide range of specifications without having to design separate IVRs for different specifications. Instead of designing separate IVRs and paying for separate mask sets for IVRs targeting different specifications (e.g., different design and mask sets for 1 A IVR, 5 A IVR), the disclosed embodiments present ways to design and fabricate large numbers of the same unit IVRs (e.g., 1 A IVR) and decide how many of them to use post-fabrication to deliver different current specifications (e.g., use five 1 A unit IVRs for 5 A, use ten 1 A unit IVRs for 10 A). These disclosed embodiments reduce the mask cost of fabricating IVRs for different specifications and reduce design time by focusing on a single unit IVR.

20 Claims, 14 Drawing Sheets

(51) Int. Cl.
*H02M 3/158* (2006.01)
*G05F 1/46* (2006.01)
*H02M 3/00* (2006.01)

(58) Field of Classification Search
CPC .......... H02M 3/158; H02M 1/12; H02M 7/04;
H02M 7/42; H02M 7/5387; H02M 3/156;
H02M 7/48; H02M 7/49; H02M 7/493
USPC .......................................................... 307/82
See application file for complete search history.

(56) References Cited

U.S. PATENT DOCUMENTS

| | | | | |
|---|---|---|---|---|
| 7,932,639 | B2* | 4/2011 | Ma | G11C 5/147 |
| | | | | 307/18 |
| 8,441,149 | B2* | 5/2013 | Trivedi | G06F 1/26 |
| | | | | 307/140 |
| 8,787,040 | B2* | 7/2014 | Huang | H02M 3/33576 |
| | | | | 323/266 |
| 8,860,396 | B2* | 10/2014 | Giuliano | H02M 3/07 |
| | | | | 323/266 |
| 2003/0020121 | A1* | 1/2003 | Rockwell | H01L 21/8258 |
| | | | | 257/378 |
| 2003/0090255 | A1 | 5/2003 | Bassett et al. | |
| 2007/0200538 | A1* | 8/2007 | Tang | H02M 3/157 |
| | | | | 323/237 |
| 2009/0121695 | A1* | 5/2009 | Pierson | H02M 3/1584 |
| | | | | 323/283 |
| 2014/0084414 | A1* | 3/2014 | Jezewski | H01L 23/5227 |
| | | | | 257/531 |

OTHER PUBLICATIONS

Kim, W. et al., "A Fully-Integrated 3-Level DC-DC Converter for Nanosecond-Scale DVFS," IEEE Journal of Solid-State Circuits (JSSC), vol. 47, No. 1, pp. 206-219 (Jan. 2012).

Kim, W. et al., "System Level Analysis of Fast, Per-Core DVFS using On-Chip Switching Regulators," IEEE International Symposium on High-Performance Computer Architecture (HPCA), 12 pages (Feb. 2008).

Le, H.-P. et al., "A sub-ns response fully integrated battery-connected switched-capacitor voltage regulator delivering 0.19W/mm2 at 73% efficiency," IEEE International Circuits Conference (ISSCC), Session 21, Power Converters, 21.6, 3 pages (Feb. 2013).

Le, H.-P. et al., "Design Techniques for Fully Integrated Switched-Capacitor DC-DC Converters," IEEE Journal of Solid-State Circuits (JSSC), vol. 46, No. 9, 12 pages (Sep. 2011).

* cited by examiner

RECONFIGURABLE POWER REGULATOR

CROSS REFERENCE TO RELATED APPLICATIONS

This application claims benefit of the earlier filing date, under 35 U.S.C. § 119(e), of U.S. Provisional Application No. 61/846,689, filed on Jul. 16, 2013, entitled "APPARATUS, SYSTEMS, AND METHODS FOR PROVIDING A RECONFIGURABLE POWER REGULATOR," which is herein incorporated by reference in its entirety.

STATEMENT REGARDING FEDERALLY SPONSORED RESEARCH OR DEVELOPMENT

This invention was made with government support under 1248828 and 1353640 awarded by the National Science Foundation (NSF). The government has certain rights in the invention.

TECHNICAL FIELD

The present disclosure relates to apparatus, systems, and methods for providing a reconfigurable power regulator.

BACKGROUND

There is a strong demand to reduce the size of electronic systems. The size reduction is especially desirable in mobile devices where area and volume are a premium. But it is also desirable in servers that are placed in big data centers because it is important to squeeze in as many servers as possible in a fixed real estate.

One of the largest components found in many electronic systems is a voltage regulator (also referred to as a power regulator). A power regulator often includes a large number of bulky off-chip components to deliver voltages to integrated chips, including, for example, processors, memory devices (e.g., a dynamic read access memory (DRAM)), radio-frequency (RF) chips, WiFi combo chips, and power amplifiers. Because many electronic systems include many power regulators, it is desirable to reduce the size of power regulators, thus reducing the overall size of electronic systems.

A power regulator can include one or more semiconductor chips that provide power (e.g., voltage and current), derived from a power source (e.g., a battery), to an output load. The one or more semiconductor chips can include a DC-DC regulator chip, and the output load can include a variety of integrated chips (e.g., an application processor, a DRAM, flash memory).

Oftentimes, the power regulator is tailored to a particular type of output load. For example, if the output load is known to consume about 1 W of power, the power regulator for the output load is tailored to deliver 1 W at the expense of degraded performance for other output power regimes.

There have been efforts to implement an integrated voltage regulator (IVR) that integrates all components of a power regulator (e.g., power switches, capacitors, inductors, controller circuits) in a single die or a single package. The challenges faced by the design engineers are that different applications demand different performance specifications (e.g., output current, input voltage, output voltage) of power regulators, and it is costly and time-consuming to design separate IVRs for different specifications.

SUMMARY

Some embodiments include a voltage regulator. The voltage regulator can include an input voltage terminal, an output voltage terminal, a ground terminal, and a plurality of unit integrated voltage regulators (IVRs). Each of the plurality of unit IVRs can include an IVR input voltage terminal, an IVR output voltage terminal, and an IVR ground terminal, wherein the input voltage terminal of each of the plurality of unit IVRs is electrically connected to the input voltage terminal of the voltage regulator, wherein the output voltage terminal of each of the plurality of unit IVRs is electrically connected to the output voltage terminal of the voltage regulator, wherein the ground terminal of each of the plurality of unit IVRs is electrically connected to the ground terminal of the voltage regulator; and wherein each of the plurality of unit IVRs has substantially identical performance characteristics.

In some embodiments, each of the plurality of unit IVRs can be configured to receive an identical control signal, thereby operating in parallel to one another.

In some embodiments, the plurality of unit IVRs can be configured to receive a time-staggered control signal, thereby operating in a poly-phase operation mode.

In some embodiments, each of the plurality of unit IVRs can be configured to receive a control signal that is not synchronized with one another, thereby operating independently.

In some embodiments, the control signal comprises a low-swing digital signal overlaid on a signal line coupled to the input voltage terminal.

In some embodiments, the control signal comprises a low-swing digital signal overlaid on a signal line coupled to the output voltage terminal.

In some embodiments, at least two of the plurality of unit IVRs are arranged adjacent to one another on a wafer, thereby reducing an effect of fabrication process variations.

In some embodiments, the plurality of unit IVRs are embodied on a single die.

In some embodiments, the plurality of unit IVRs are embodied on a plurality of dies packaged in a single package.

In some embodiments, the plurality of unit IVRs are embodied in a plurality of packages coupled via a printed circuit board.

Some embodiments include an electronic system. The electronic system can include a load chip comprising a first power domain, wherein the first power domain comprises a input voltage terminal and a ground terminal. The electronic system can also include a first voltage regulator in accordance with embodiments disclosed herein, wherein the first voltage regulator comprises an input voltage terminal, an output voltage terminal, and a ground terminal, wherein the output voltage terminal of the first voltage regulator is electrically coupled to the input voltage terminal of the first power domain, and wherein the ground terminal of the first voltage regulator is electrically connected to the ground terminal of the first power domain.

In some embodiments, the load chip comprises a second power domain, wherein the second power domain comprises an input voltage terminal and a ground terminal. The electronic system can further include a second voltage regulator in accordance with embodiments disclosed herein, wherein the second voltage regulator comprises an input voltage terminal, an output voltage terminal, and a ground terminal, wherein the output voltage terminal of the second voltage regulator is electrically coupled to the input voltage terminal of the second power domain, and wherein the ground terminal of the second voltage regulator is electrically connected to the ground terminal of the second power domain.

In some embodiments, the first voltage regulator and the second voltage regulator are configured to provide, to the load chip, operating information associated with the first voltage regulator and the second voltage regulator, respectively.

In some embodiments, the first voltage regulator is configured to receive, from the load chip, an adjustment command, requesting the first voltage regulator to adjust its operation.

In some embodiments, the operating information of the first voltage regulator comprises a switching frequency information of the first voltage regulator.

In some embodiments, the load chip is configured to receive, from the first voltage regulator and the second voltage regulator, operating information associated with the first voltage regulator and the second voltage regulator, respectively, and determine whether one of the first voltage regulator or the second voltage regulator is operating at a frequency higher than a nominal frequency.

In some embodiments, when the first voltage regulator is operating at a frequency higher than a nominal frequency, the load chip is configured to provide an adjustment command, to the first voltage regulator, to cause the first voltage regulator to reduce its operating frequency.

In some embodiments, the electronic system can also include a third voltage regulator in accordance with embodiments disclosed herein, and a power management module configured to determine an amount of current drawn by the first power domain, and is further configured to cause the third voltage regulator to provide current to the first power domain.

In some embodiments, the electronic system can also include a switch matrix coupled to the first voltage regulator and the third voltage regulator, and wherein the power management module is configured to cause the switch matrix to couple the third voltage regulator to the first power domain.

In some embodiments, the electronic system comprises one of a smart phone, a wearable computing device, or a tablet computer.

Some embodiments include an apparatus for providing a voltage regulator. The apparatus can be configured to determine an amount of output current to be provided by the voltage regulator; determine a number of unit integrated voltage regulators (unit IVRs) for providing the amount of output current, wherein each of the unit IVRs is configured to operate independently to provide an amount of current within a predetermined range; select the number of unit IVRs for the voltage regulator; and arrange the selected unit IVRs in parallel to provide the voltage regulator.

In some embodiments, the apparatus is configured to arrange the selected unit IVRs by cutting a portion of a wafer comprising the number of unit IVRs.

In some embodiments, the apparatus is configured to select the number of unit IVRs that are in close proximity to one another on a wafer.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the apparatus, systems, and methods of the disclosed subject matter and the environment in which such apparatus, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other apparatus, systems, and methods that are within the scope of the disclosed subject matter.

An electronic system can be tightly integrated on a single chip, also referred to as a system-on-chip (SoC), which can include multiple processing cores and heterogeneous components (e.g., memory controllers, hardware accelerators). The popularity of SoCs, coupled with a lower power budget, motivates dynamically controlling (1) the voltage provided to the SoC and/or (2) the operating frequency of the SoC. Such a dynamic control of voltage and frequency is referred to as dynamic voltage and frequency scaling (DVFS.)

Figure 1:
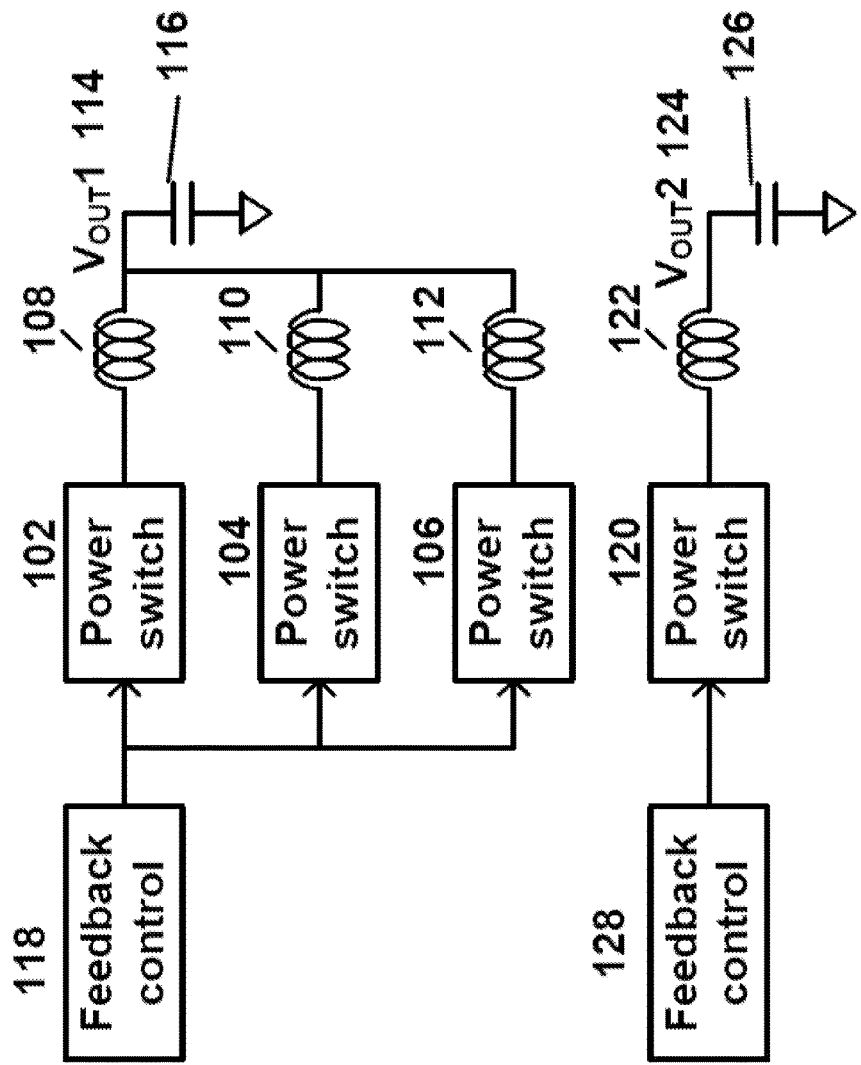
FIG. 1 illustrates an off-chip voltage regulator.

Traditionally, the DVFS has been performed using an off-chip voltage regulator. FIG. 1 illustrates an off-chip voltage regulator. An off-chip voltage regulator can include power switches 102, 104, 106, 120, inductors 108 110, 112, 122, capacitors 116, 126, and feedback controls 118, 128. Each of these components is often contained in separate packages and connected to one another on a printed-circuitboard (PCB). Therefore, the volume of the off-chip voltage-regulator is large, and a parasitic capacitance associated with the off-chip regulator is significant, which decreases responsiveness (e.g., a bandwidth) of the off-chip regulator.

Because of the physical volume and the cost of off-chip regulators, traditional dynamic voltage and frequency scaling (DVFS) has been performed at a coarse-grain level. In a coarse-grain DVFS, the voltage and frequency are dynamically varied at a coarse granularity, for example, at a chip-level granularity where the same voltage is provided to the entire chip (or a large portion of the chip). Moreover, the traditional DVFS scheme has been limited to a slow voltage/frequency scaling at a micro-second timescale due to slow responsiveness of off-chip voltage regulators.

Figure 2:
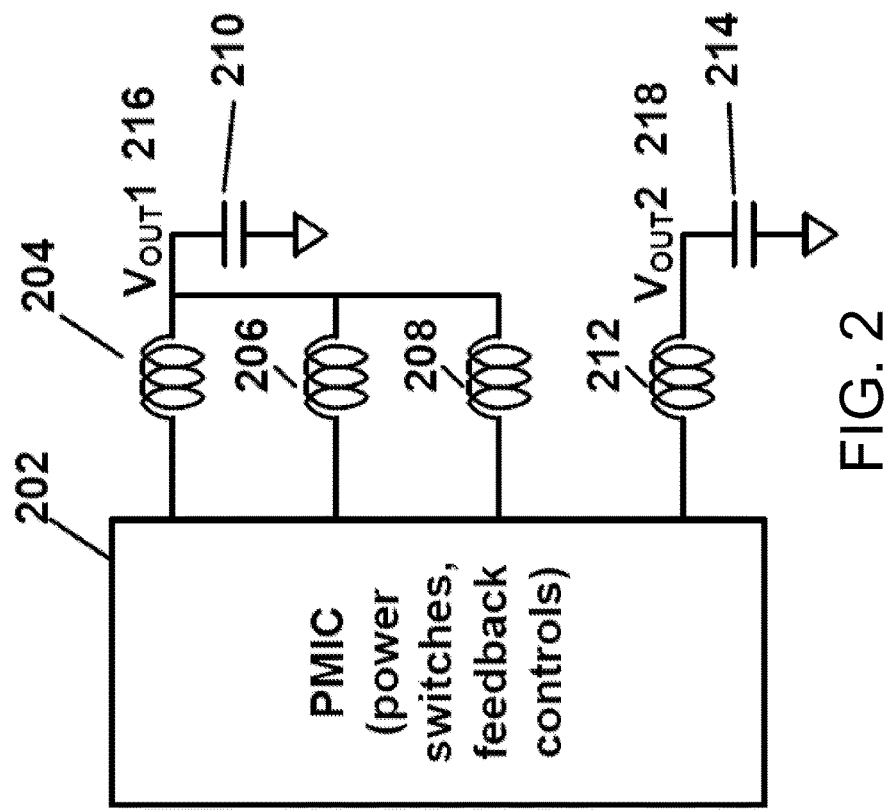
FIG. 2 illustrates a power management integrate circuit (PMIC.)

In some cases, one or more voltage regulators can be packaged as a single component called a power management IC (PMIC). FIG. 2 illustrates a PMIC in accordance with some embodiments. The PMIC 202 can include multiple power switches and feedback controls in a single package, thereby providing several voltage regulators in a single package. Therefore, the PMIC 202 can reduce the area/volume associated with voltage regulators. Furthermore, the parasitic capacitance originating from the multiple power switches and feedback controls can be smaller than the parasitic capacitance from off-chip power switches and feedback controls. Therefore, the PMIC 202 can improve responsiveness of voltage regulators (e.g., increase the bandwidth of voltage regulators.) However, a PMIC still needs discrete, off-chip components, such as the inductors 204, 206, 208, 212 and the capacitors 210, 214, which can limit the size/volume reduction and the responsiveness of a PMIC.

A PMIC is usually customized to accommodate a circuit block of a predetermined power specification. The predetermined power specification, for example, can indicate a number of power domains and an amount of current drawn by each power domain. In the example illustrated in FIG. 2, the PMIC 202 is configured to deliver voltages to two power domains by providing two voltage rails $V_{OUT}1$ 216 and $V_{OUT}2$ 218. For example, the PMIC 202 can provide $V_{OUT}1$ 216 using a three-phase voltage regulator with three off-chip, on-PCB discrete inductors 204-208, thereby delivering a large amount of current (e.g., high power). The PMIC 202 also provides $V_{OUT}2$ 218 using a single-phase voltage regulator with one off-chip, on-PCB discrete inductor 212, thereby delivering lower current (e.g., lower power). This way, the PMIC 202 can accommodate two power domains, the first one with a high power requirement and the second one with a low power requirement.

Because a PMIC is customized for a particular circuit block, different, unique PMICs need to be designed for different circuit blocks. Not only does the customization increase the design time and cost, but the customization also increases the fabrication cost. One of the important factors in the PMIC fabrication cost is a mask cost, e.g., cost for making a set of lithography masks corresponding to a desired PMIC. The mask cost is a non-recurring cost in that the mask cost is incurred only once for a single design.

Although the mask cost is non-recurring, it can become significant when a design has to be changed or a different design is required for different circuit blocks. Because a mask cost for cutting-edge lithography processes, such as a 28 nm process, can be as high as $1-2 million, the mask cost cannot be ignored. Since each customized PMIC needs to use its own set of masks, the mask cost for fabricating PMICs of varying specifications can quickly become significant. Moreover, manufacturing PMICs take several weeks, which can increase product cycle time. In markets like mobile electronics where the time-to-market is very important, incurring several weeks of cycle time for every customized PMIC can cause significant damage to the business.

Given these drawbacks of off-chip voltage regulators and PMICs, there has been a surge of interest in building an integrated voltage regulator (IVR) that contains all of the components of a voltage regulator in a single chip or a single package, and that can, sometimes, be integrated directly on the SoC. An IVR can enable a fine-grain DVFS for dynamically varying the voltage and the frequency at a block-specific granularity. The block-specific voltage control can allow a DVFS system to raise the voltage of only the particular circuit block(s) that requires a higher performance, as opposed to raising the voltage of the entire chip which would unnecessarily incur power dissipation. This way, the fine-grain DVFS can improve a performance of an electronic system without incurring a significant power overhead.

Furthermore, an IVR can also enable a faster DVFS at a nano-second timescale due to its fast responsiveness. The faster DVFS at a nano-second timescale can significantly reduce the power consumption of an SoC by rapidly varying the voltage provided to a part of the SoC based on a rapidly changing computation demand.

Although conventional IVRs can reduce an area or volume of an electronic system compared to off-chip voltage regulators and PMICs, conventional techniques for building a customized IVR unfortunately do not address the mask-cost and long time-to-market. For example, a first IVR, customized to provide 1 A of output current and a second IVR, customized to provide 10 A of output current, cannot share the same set of masks. Just like their off-chip counterparts, IVRs also need to be customized for different power specifications, adding product cycle time for each customized IVR.

The present disclosure provides apparatus, systems, and methods for addressing a mask cost associated with customized IVRs. In particular, the disclosed apparatus, systems, and methods can be used to provide customized IVRs, satisfying a wide range of power specifications and applications, using a single set (e.g., a limited number) of masks. The disclosed apparatus, systems, and methods can use a unit IVR that is configured to accommodate predetermined power characteristics. Thus, at a design time, only a unit IVR can be designed and fabricated. Then, during a package time (e.g., post-fabrication), a plurality of unit IVRs can be arranged to provide a desired number of power domains and a desired amount of current to each power domain. This way, a wide variety of customized IVRs can be built post-fabrication, thereby providing a lot of flexibility to regulator designers.

For example, if a unit IVR is configured to provide an output voltage of 1V at 0.1 A, and if a target application of the IVR requires an output voltage of 1V at 0.3 A, then three unit IVR can be arranged in parallel to provide an output voltage of 1V at 0.3 A. Oftentimes, the unit IVR is configured to provide a range of output voltage at a range of output current. Thus, a plurality of unit IVRs (e.g., "N" number of IVRs) can be arranged in parallel to provide an output voltage that is within the output voltage range of the unit IVR while providing an output current that is N times more than a current within the range of output current of a single unit IVR.

The parallel arrangement of the unit IVRs can refer to an arrangement in which one or more terminals of unit IVRs are electrically connected. For example, a unit IVR can include an input voltage terminal, an output voltage terminal, and a ground terminal, and a parallel arrangement of unit IVRs can refer to an arrangement in which the input voltage terminals of the unit IVRs are electrically connected; an arrangement in which the output voltage terminals of the unit IVRs are electrically connected; and/or an arrangement in which the ground terminals of the unit IVRs are electrically connected. As referred herein, a ground terminal can refer to an Earth ground, a circuit ground, a signal ground, a floating ground, a virtual ground, and/or any other suitable ground.

As another example, if a target application of the IVR requires three power domains of varying power characteristics, three IVR groups can be provided, where each IVR group is configured to provide power to a separate power domain. The number of IVRs in each set of IVRs can determine the output power characteristics of the set of IVRs.

Therefore, a power regulator design company can use unit IVRs, which can be fabricated with a single set of masks, to provide customized IVRs. Compared with the conventional requirement of using a different set of masks for each customized IVR, using a single set of masks for a variety of customized IVRs provides a large fabrication cost reduction for the power regulator design company. Product cycle time can be shorter because unit IVRs would have already been fabricated and ready to be packaged together. Fabrication usually takes much longer than packaging and assembly in post-fabrication, so a significant portion of the IVR product cycle time can be eliminated by having unit IVRs fabricated and ready to be packaged and assembled.

The disclosed mechanism of using "unit voltage regulators" has not been attempted previously because the cost for making masks has not been significant for voltage regulators. For example, PMICs are often built in relatively mature process nodes (e.g., 0.18 µm process or older) in which the mask cost is comparatively low. Therefore, power regulator designers were not concerned with the cost for making masks. However, there is a clear trend that PMICs are moving to more advanced nodes and as a result, mask cost will quickly become significant in the near future.

Also, the disclosed mechanism of using "unit voltage regulators" has not been attempted previously because it has not been practical to use many voltage regulators in a single system. A traditional "unit" off-chip regulator, as illustrated in FIG. 1, could include multiple off-chip components. Therefore, the area overhead of using multiple "units" of off-chip regulators has been significant. This is why designers instead used PMICs as illustrated in FIG. 2. Because PMICs are, by nature, custom built chips, PMICs have not been utilized as "units."

Furthermore, power regulator designers have not been motivated enough to build voltage regulators having a large variety of output current specifications. In a coarse-grain DVFS system, the amount of power (or current) drawn by power domains do not differ greatly, and can often be satisfied using a single voltage regulator or a handful of voltage regulator designs. Therefore, there has not been a significant motivation for designers to build voltage regulators satisfying a variety of output current specifications. In contrast, in a fine-grain DVFS system that is gaining popularity, an amount of power (or current) drawn by a power domain can vary greatly depending on the number of transistors coupled to the power domain and an amount of activity in circuit blocks coupled to the power domain. Therefore, a fine-grain DVFS system tends to require an unprecedented variety of power regulators that cannot be satisfied with a single design of a power regulator. The disclosed apparatus, systems, and methods address these important and challenging issues with a unique, creative, and simple technique of assembling unit IVRs in parallel. The disclosed apparatus, systems, and methods provide a unique solution to a problem that previous power regulator designers have not foreseen or anticipated.

In some embodiments, a unit IVR can be configured to provide a predetermined load current specification. In some examples, a unit IVR can provide an output load current of 1 A; in other examples, a unit IVR can provide an output load current of 5 A. In some embodiments, a unit IVR can be configured to provide a predetermined range of output current. For example, a unit IVR can be configured to provide an output current between 0.01 A to 1 A; a unit IVR can be configured to provide an output current between 0.1 A to 10 A; or a unit IVR can be configured to provide an output current between 1 A to 100 A. The range of output current can depend on the size of the switches in the IVR, the value of the passive components in the IVR, such as an inductor or a capacitor, and an operating frequency of the IVR.

In some embodiments, an IVR group having multiple unit IVRs (e.g., coupled to the same power domain) can be controlled using the same set of control signals. For example, the power switches in the unit IVRs can be turned on and off substantially simultaneously. In other embodiments, unit IVRs arranged in parallel can be controlled using a poly-phase control signal. For example, when a first IVR, a second IVR, and a third IVR are arranged in parallel, then the three IVRs can be controlled using a three-phase control system. In such a system, the three IVRs can be controlled by signals that are interleaved by predetermined degrees, such as 120 degrees. For example, if a switching frequency of a three-phase controlled IVR is 100 MHz and all the switches are turned on and off periodically every 10 ns, one IVR can be turned on at a time instance of 0 second, the second one can be turned on at a time instance of (10/3) ns, and the third can be turned on at a time instance of (20/3) ns. In other embodiments, unit IVRs arranged in parallel can be controlled by signals that are not synchronized with one another.

In some embodiments, an IVR group can include a plurality of unit IVRs, each of which has an identical design. In some cases, these IVRs with an identical design can be fabricated using a single mask. In some cases, these IVRs in the IVR group can be fabricated in the same fabrication batch; in other cases, these IVRs in the IVR group can be fabricated in separate fabrication batches.

In other embodiments, an IVR group can include a plurality of unit IVRs, each of which has identical performance characteristics (or substantially identical performance characteristics, considering the effect of process variations). For example, the unit IVRs in the IVR group can be configured to provide the same predetermined load current specification, including, for example, an output current range, a tolerable range of output current ripples, an output voltage range, a tolerable range of output voltage ripples, a switching frequency of the unit IVR, and/or any other parameters that may affect the output of the unit IVR. In some embodiments, these unit IVRs may have an identical design at the architecture level or the circuit level; in other embodiments, these unit IVRs may have different designs at the architecture level or the circuit level.

In other embodiments, an IVR group can include a plurality of unit IVRs, each of which has distinct performance characteristics. These unit IVRs can have different designs. In some embodiments, these unit IVRs can be fabricated on the same wafer; in other embodiments, these unit IVRs can be fabricated on different wafers.

In some embodiments, a unit IVR, whether it is a die or a package, can include circuit blocks and pins to operate independently. For example, a unit IVR can include power switches, capacitors, inductors, and feedback control circuits. Example of pins of an IVR are listed in the table below. Each unit IVR can be configured to communicate with a load chip, such as an SoC or an application processor, using a communication protocol, such as an Inter-Integrated Circuit (I²C) protocol, a Power Management Bus (PMBus) protocol, and a Serial Peripheral Interface (SPI) Bus protocol, to deliver a desired voltage and current to the load chip.

TABLE

| Pin Name | Functions | Type |
| --- | --- | --- |
| $V_{IN}$ | Input voltage | power |
| GND | Ground | power |
| $V_{OUT}$ | Output voltage | power |
| SDA | I²C data input and output | I/O |
| SCL | I²C Clock | I |
| Vsync | Clock input for synchronizing | I |
| $V_{IN\_1}$ | Power input for internal block | I |
| Sub | Digital output for power-OK signal | O |
| $R_{set}$ | Connected by resistor for generating current accurately | I |
| Test | Test pin that monitors various signals within the chip | O |

Figures 3A, 3B:
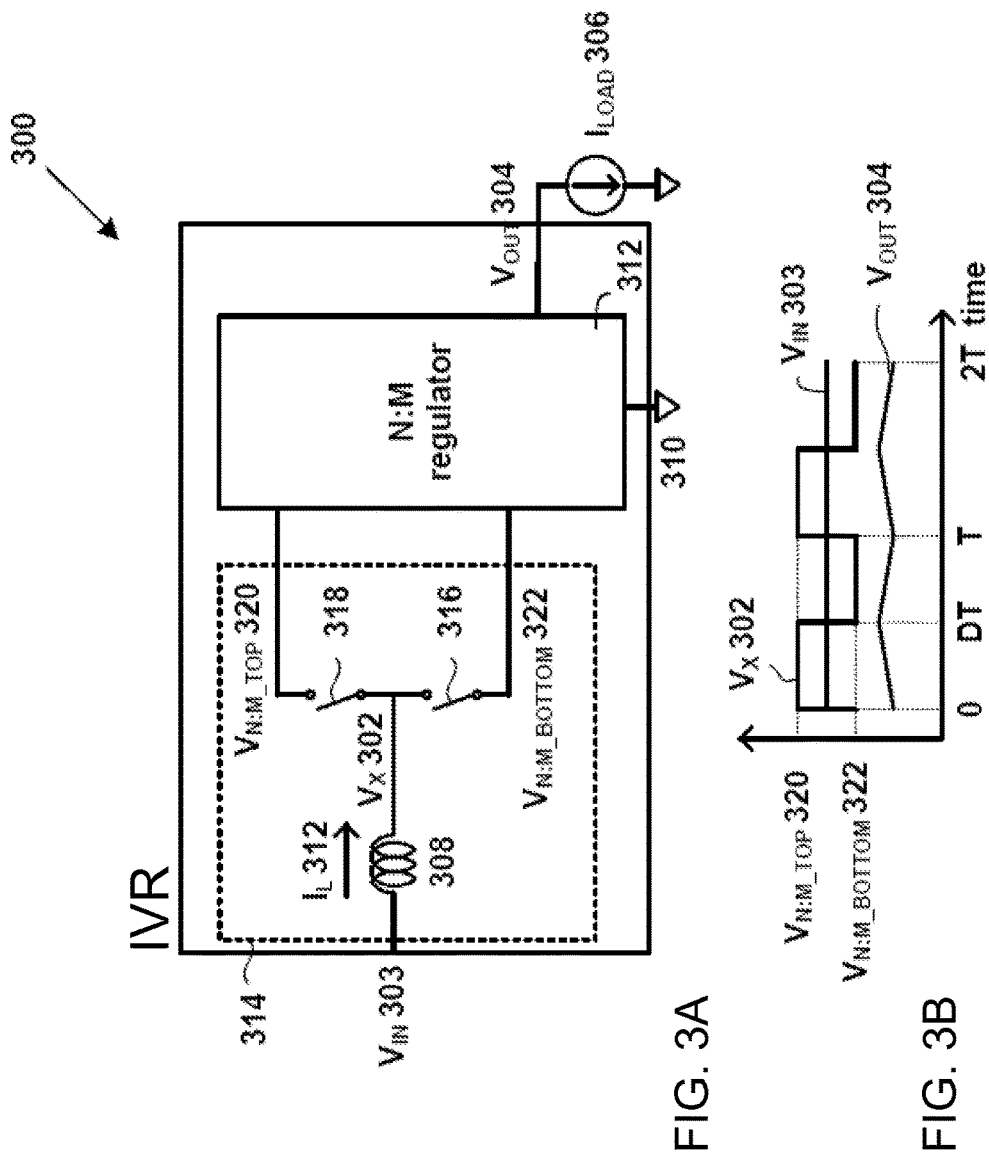
FIGS. 3A-3B illustrate one particular example of a hybrid regulator in accordance with some embodiments.

In some embodiments, a unit IVR can include a hybrid regulator. FIGS. 3A-3B illustrate one particular example of a hybrid regulator in accordance with some embodiments. A hybrid regulator can include two or more types of voltage regulators. The hybrid regulator can provide many advantages, one of which is a high voltage conversion efficiency for a wide range of output voltages. A flipped buck regulator based hybrid regulator is useful because the flipped buck regulator based hybrid regulator can provide an output voltage that can be higher than the input voltage. As shown in FIG. 3A, the hybrid regulator 300 can include a switched-inductor regulator having a flipped buck regulator 314, which is coupled to a step-down regulator 312. The flipped buck regulator 314 includes an inductor 308 and a plurality of switches 316, 318. Unlike conventional buck regulators, the flipped buck regulator 314 is coupled to $V_{IN}$ 303 via the inductor 308, and provides two voltages $V_{N:M\_TOP}$ 320 and $V_{N:M\_BOTTOM}$ 322 to the step-down regulator 312. Subsequently, the step-down regulator 312 can use $V_{N:M\_TOP}$ 320 and $V_{N:M\_BOTTOM}$ 322 to generate an output voltage $V_{OUT}$ 604. The step-down regulator 312 can include a switch capacitor voltage regulator.

In the flipped buck regulator 314, the input voltage $V_{IN}$ 303 is equivalent to the weighted average of the two voltages provided to the step-down regulator: $V_{N:M\_TOP}$ 320 and $V_{N:M\_BOTTOM}$ 322. The flipped buck regulator 314 is configured so that the input voltage coupled to the inductor 308 is equivalent to $V_{N:M\_TOP}D+V_{N:M\_BOTTOM}(1-D)$, where D, a number between 0 and 1, is the duty cycle in which $V_X$ 602 is coupled to $V_{N:M\_TOP}$. Since $V_{IN}$ is fixed, $V_{N:M\_TOP}$ 320 and $V_{N:M\_BOTTOM}$ 322 are configured to change depending on how long $V_X$ 602 stays coupled to $V_{N:M\_TOP}$ 320 and how long $V_X$ 602 stays coupled to $V_{N:M\_BOTTOM}$ 322.

FIG. 3B illustrates the timing diagram of signals in the hybrid regulator of FIG. 3A. FIG. 3B illustrates that the input voltage $V_{IN}$ 303 coupled to the inductor 308 is a fixed voltage. This fixed input voltage $V_{IN}$ 303 is used to generate two separate voltages, $V_{N:M\_TOP}$ 320 and $V_{N:M\_BOTTOM}$ 322, which are also fixed voltages. The internal node $V_X$ 602 is switched between $V_{N:M\_TOP}$ 320 and $V_{N:M\_BOTTOM}$ 322 at a duty cycle of D. The step-down regulator 312 uses $V_{N:M\_TOP}$ 320 and $V_{N:M\_BOTTOM}$ 322 as two inputs to generate an output voltage $V_{OUT}$ 604.

In some embodiments, a unit IVR can be one of a linear regulator, a switching regulator, such as a buck voltage regulator, boost voltage regulator or a switch-capacitor voltage regulator, a silicon controlled rectifier (SCR), or a hybrid regulator. In some embodiments, an IVR can be designed in accordance with an article entitled "System Level Analysis of Fast, Per-Core DVFS using On-Chip Switching Regulators," published in IEEE International Symposium on High-Performance Computer Architecture (HPCA) in February 2008, by Wonyoung Kim et al.; an article entitled "Design Techniques for Fully Integrated Switched-Capacitor DC-DC Converters," published in IEEE Journal of Solid-State Circuits (JSSC) in September 2011, by Hanh-Phuc Le et al.; an article entitled "A Fully-Integrated 3-Level DC/DC Converter for Nanosecond-Scale DVFS," published in IEEE Journal of Solid-State Circuits (JSSC) in January 2012, by Wonyoung Kim et al.; an article entitled "A Sub-ns Response Fully-Integrated Battery-Connected Switched-Capacitor Voltage Regulator Delivering 0.19 W/mm2 at 73% Efficiency," published in IEEE International Solid-State Circuits Conference (ISSCC) in February 2013, by Hanh-Phuc Le et al., each of which is hereby incorporated by reference herein in its entirety. In other embodiments, an IVR can be designed in accordance with hybrid power regulators disclosed in U.S. Provisional Patent Application No. 61/810,998, filed on Apr. 11, 2013, entitled "SYSTEMS AND METHODS FOR PROVIDING A HYBRID VOLTAGE REGULATOR," which is herein incorporated by reference in its entirety.

Figure 4:
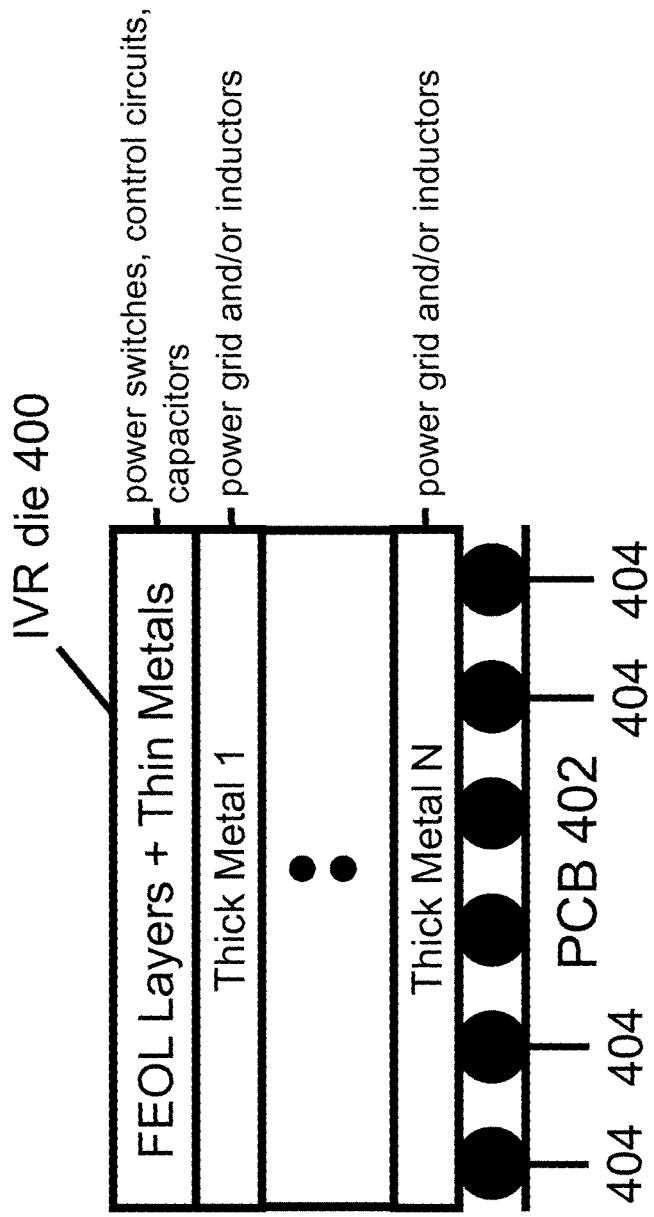
FIGS. 4-5 illustrate an integrated voltage regulator (IVR) in accordance with some embodiments.
Figure 9:
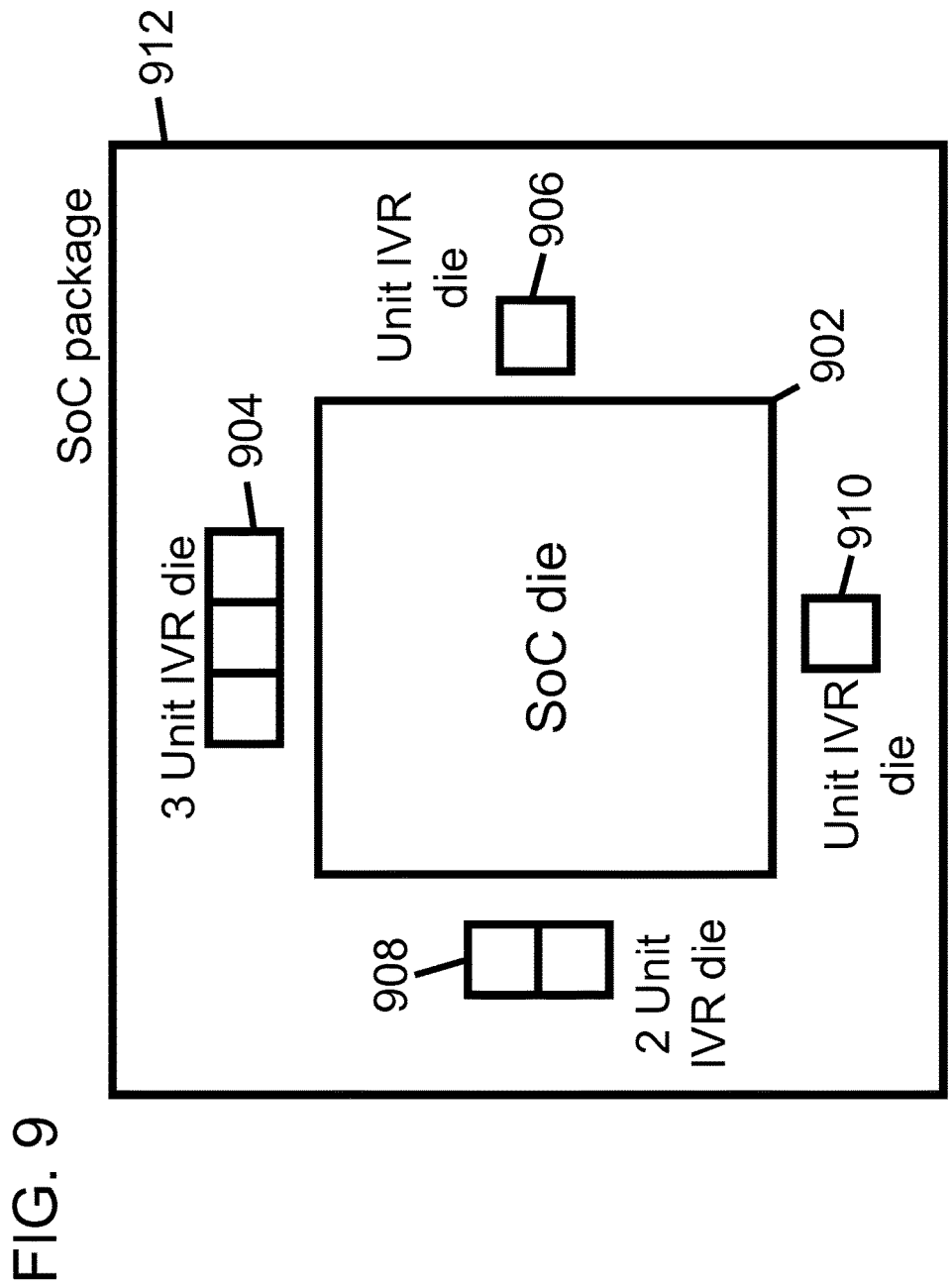
FIG. 9 illustrates a single package having a system-on-chip (SoC) die and IVRs in accordance with some embodiments.
Figure 10:
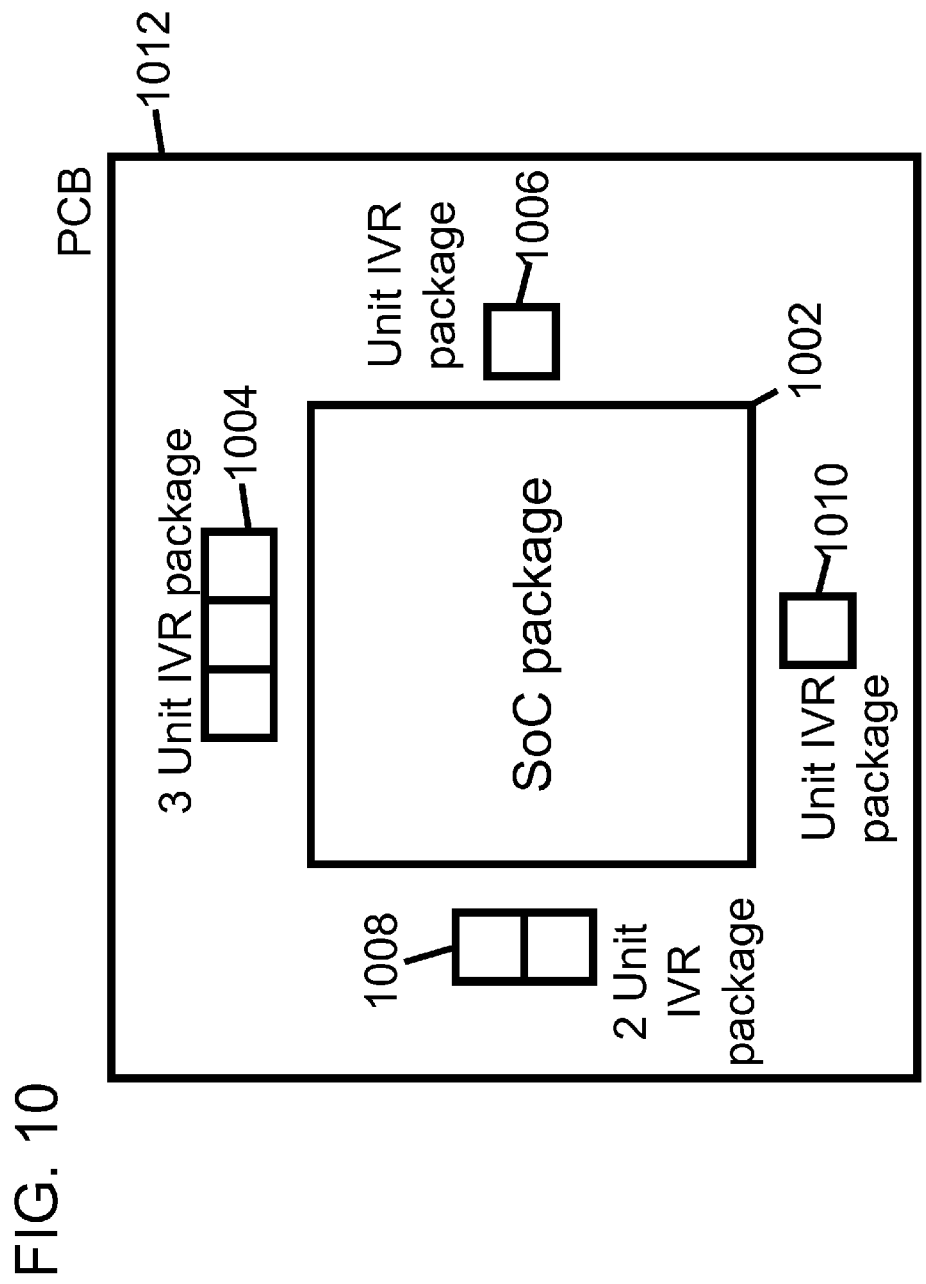
FIG. 10 illustrates a printed circuit board having an SoC package and IVRs in accordance with some embodiments.
Figure 11:
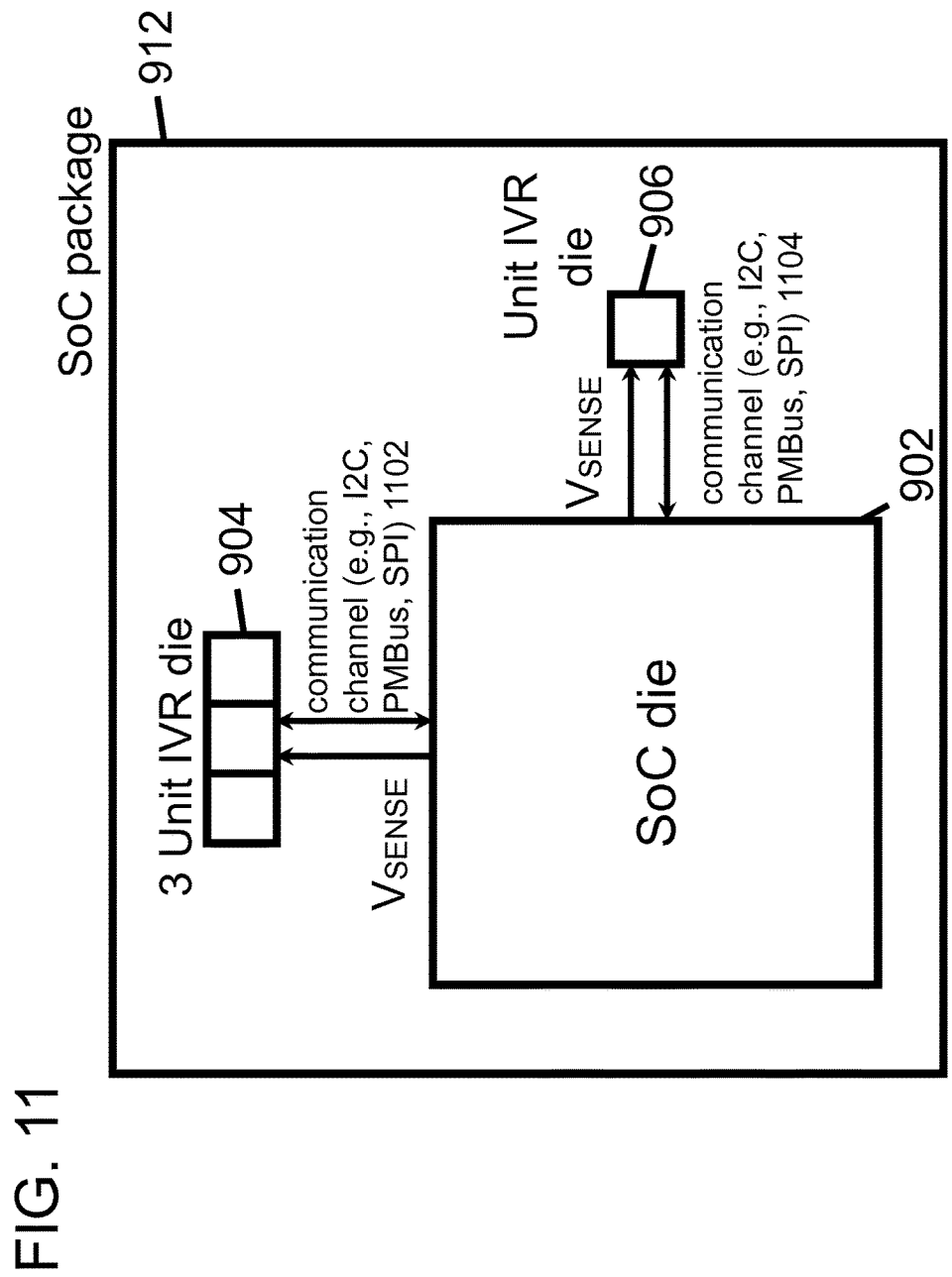
FIG. 11 includes an SoC package having an SoC and two IVR groups in accordance with some embodiments.
Figure 12:
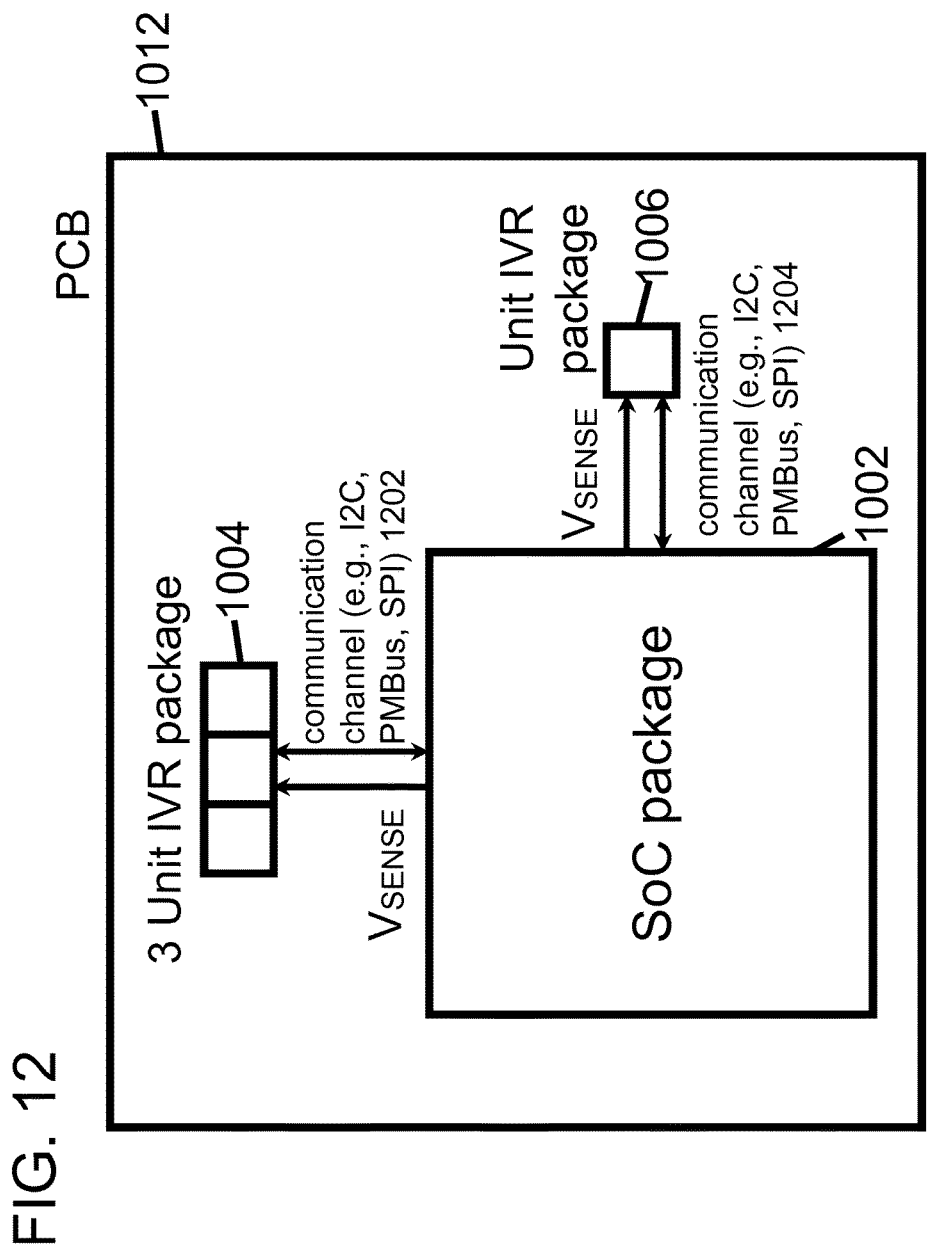
FIG. 12 illustrates communication between an SoC and IVR groups packaged in independent packages in accordance with some embodiments.

In some embodiments, a unit IVR can have all components are integrated on a single die. FIG. 4 illustrates an integrated regulator in accordance with some embodiments. An IVR die 400 can include switches, feedback control circuitries, and capacitors in the upper metal layers of the IVR die 400, including the front-end-of-line (FEOL) layers and thin metal layers, while the IVR die 400 can include one or more inductors in the lower metal layers that can accommodate thicker metals. The FEOL layers include one of the bottom layers in an integrated-chip (IC) where the individual active and passive devices (transistors, capacitors, resistors, etc.) are patterned. In some cases, the unit IVR can be used as a bare die, as illustrated in FIGS. 9, 11. In other cases, the unit IVR can be used as a packaged chip, as illustrated in FIGS. 10, 12. FIG. 4 illustrates a flip-chip packaging implementation in which the IVR die 400 is flipped for a flip-chip package. However, the IVR die 400 can be packaged in an up-right package as well. The IVR die 400 can be coupled to the printed circuit board (PCB) via solders 404. The upper layers can be coupled to the lower layers through a set of interconnects such as vias and metals. In some cases, the IVR die 400 can be packaged using a wafer-level-package (WLP).

Figure 5:
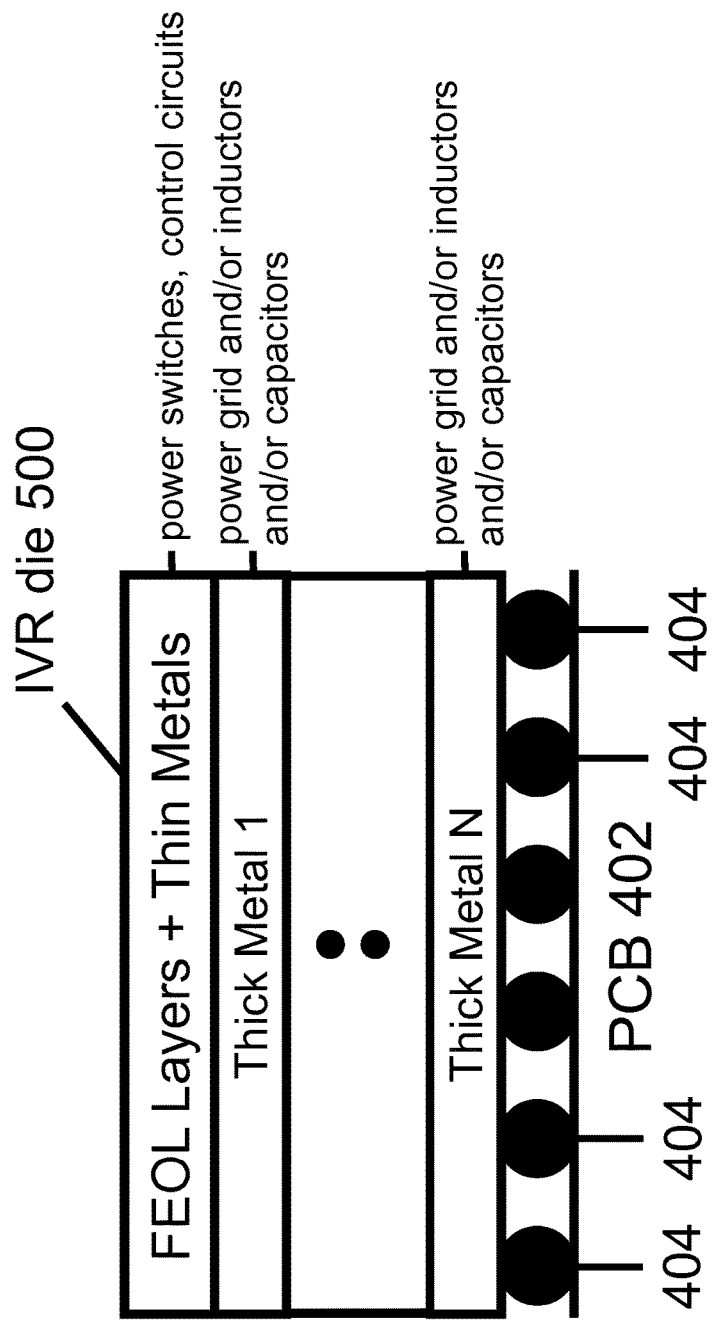

In some embodiments, a unit IVR can be implemented as an integrated regulator in which all components are integrated on a single die, but in a different configuration compared to FIG. 4. FIG. 5 illustrates an integrated regulator in accordance with some embodiments. An IVR die 500 can include switches and feedback control circuitries in the upper metal layers, including the front end of line layers and thin metal layers, while the IVR die 500 can include capacitors and inductors in the lower metal layers with thicker metals and materials necessary for denser capacitors. The upper layers can be coupled to the lower layers through a set of interconnects such as vias and metals.

Figure 6:
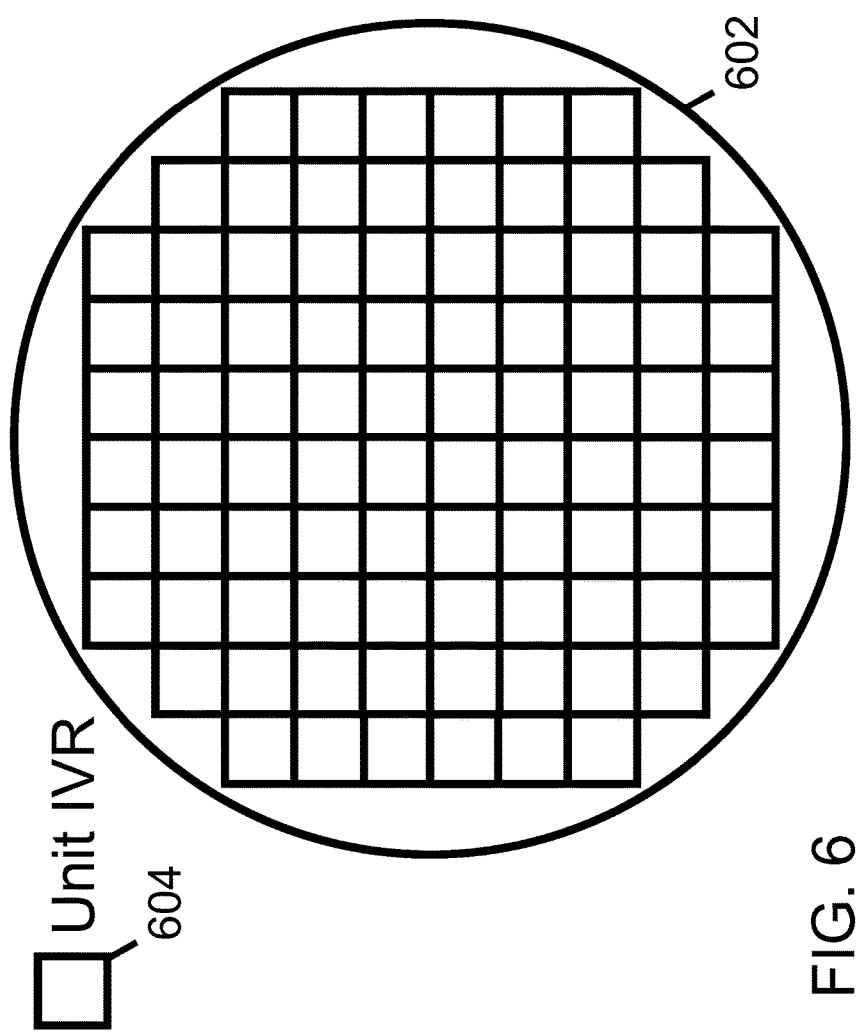
FIG. 6 illustrates a wafer that includes multiple unit integrated voltage regulators (unit IVRs) in accordance with some embodiments.

FIG. 6 illustrates a wafer that includes multiple unit IVRs in accordance with some embodiments. The wafer 602 includes a plurality of unit IVRs 604. The plurality of unit IVRs 604 can represent IVR dies (e.g., a piece of a wafer corresponding to an IVR) or IVR packages (e.g., wafer level packages). A single set of lithography masks can be used to fabricate the wafer 602 having a plurality of unit IVRs 604. The single set of lithography masks can be iteratively used over time to fabricate multiple wafers having a plurality of unit IVRs 604.

The wafer 602 can be diced (e.g., cut into pieces) into a plurality of physically separate, diced IVRs. In some cases, the wafer 602 can be diced into a plurality of physically separate diced IVRs where each diced IVR includes one unit IVR. Subsequently, some of the diced IVRs can be arranged in parallel to build a customized IVR tailored to a particular circuit block or a particular specification. A set of diced IVRs configured to provide power to the same power domain can be referred to as an IVR group.

Figure 7:
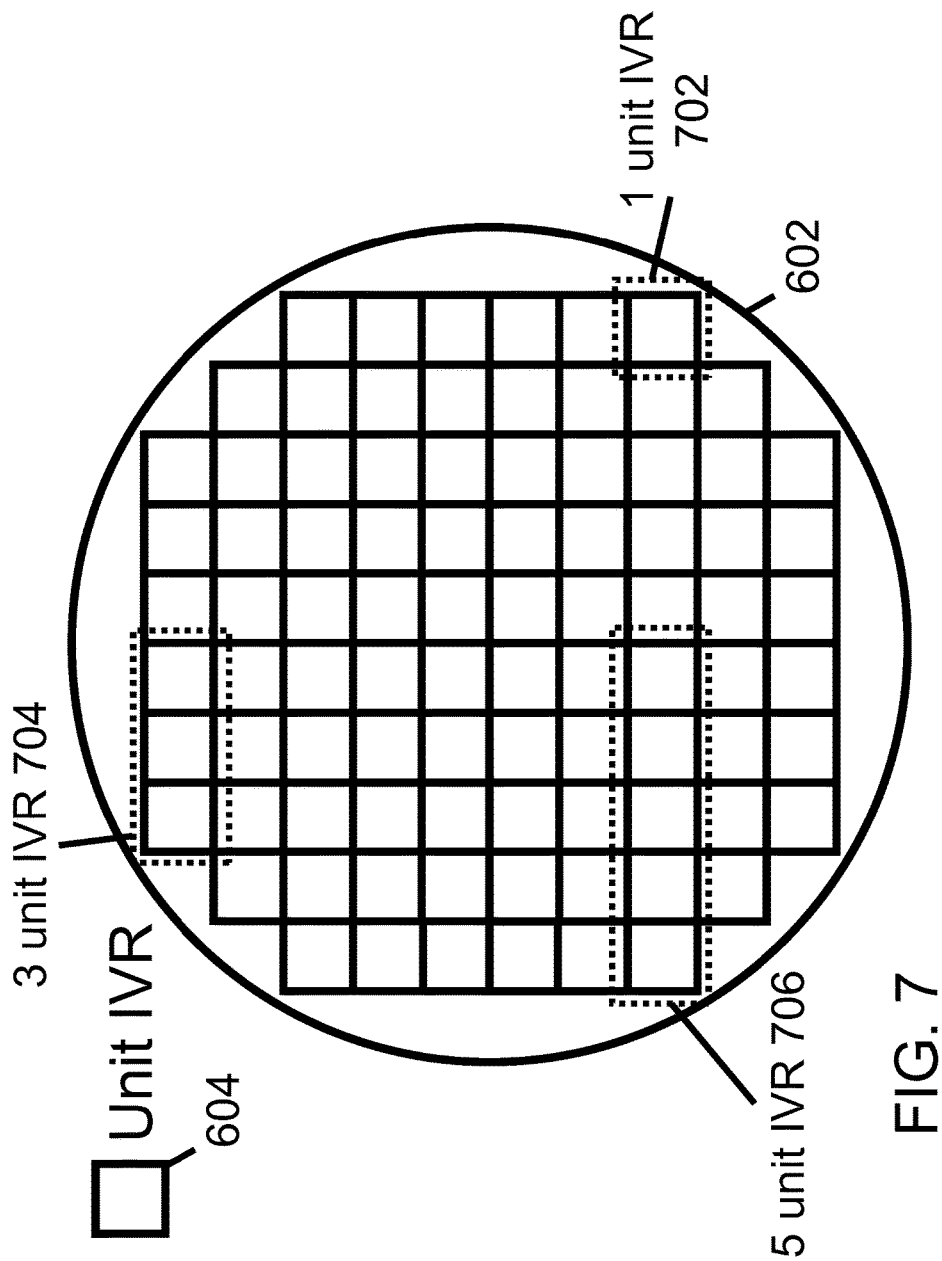
FIG. 7 illustrates a strategy for dicing a wafer to build an IVR group in accordance with some embodiments.

In some cases, the wafer 602 can be diced into a plurality of physically separate, diced IVRs where each diced IVR includes an IVR group (e.g., one or more unit IVRs) customized for a particular circuit group or a particular specification. FIG. 7 illustrates a strategy for dicing a wafer to directly build an IVR group in accordance with some embodiments. For example, when a unit IVR 604 is configured to provide an output current of 0.1 A, and a target circuit block of a customized IVR requires 0.1 A, then the wafer 602 can be diced so that a diced IVR includes 1 unit IVR, as illustrated by a first diced IVR 702. As another example, when a unit IVR 604 is configured to provide an output current of 0.1 A, and a target circuit block of a customized IVR requires 0.3 A, then the wafer 602 can be diced so that a diced IVR includes an IVR group having 3 unit IVRs, as illustrated by a second diced IVR 704. As yet another example, when a unit IVR 604 is configured to provide an output current of 0.1 A, and a target circuit block of a customized IVR requires 0.5 A, then the wafer 602 can be diced so that a diced IVR includes an IVR group having 5 unit IVRs, as illustrated by a third diced IVR 706. In other examples, a diced IVR can include any number of unit IVRs depending on a target power output or a target current output of the diced IVR.

In some embodiments, diced IVRs can be packaged independently in a separate package. In other embodiments, two or more diced IVRs can be packaged together in a single package, forming an IVR-based PMIC. This way, PMICs of a wide range of specifications can be easily designed. In other embodiments, a diced IVR can be packaged in the same package as the target circuit block, such as a system on chip, thereby forming a system in package (SiP).

Figure 8:
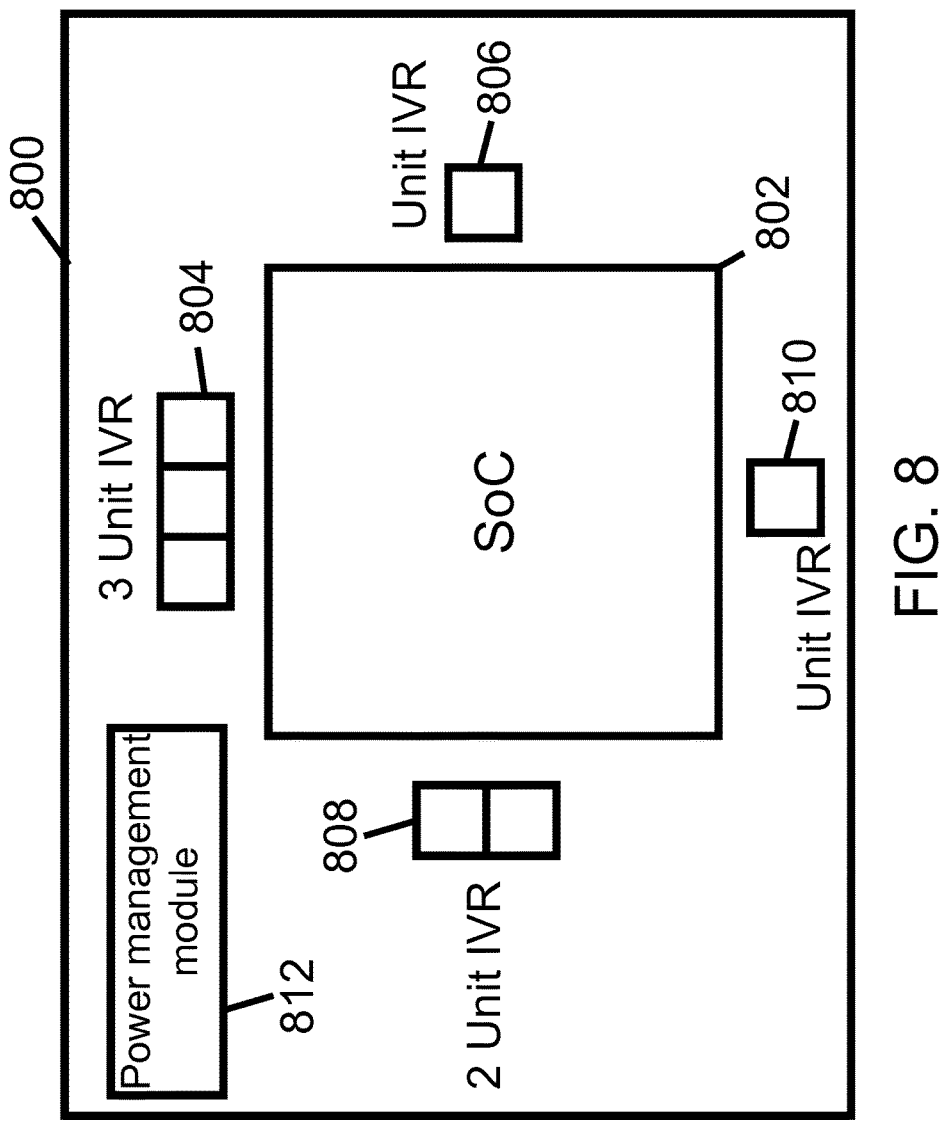
FIG. 8 illustrates an arrangement of IVRs and a system on chip in an electronic system in accordance with some embodiments.

FIG. 8 illustrates an arrangement of diced IVRs and a system on chip in an electronic system in accordance with some embodiments. FIG. 8 shows an electronic system 800 that includes a system on chip (SoC) 802, a first diced IVR 804 including three unit IVRs, a second diced IVR 806 including one unit IVR, a third diced IVR 808 including two unit IVRs, and a fourth diced IVR 810 including one unit IVR. If one unit IVR is designed to deliver 1 A, a total of 7 A can be delivered by the four diced IVRs 804-810 since seven unit IVRs are deployed. Therefore, instead of creating separate IVR designs and mask sets for each IVR, an IVR designer can simply design a single unit IVR and arrange them accordingly post-fabrication in order to build a customized IVR.

In some embodiments, each of the diced IVRs can be coupled to a separate power domain of a SoC 802. For example, the SoC 802 can include four power domains, and each of the diced IVRs 804-810 can be independently coupled to each of the power domains separately. In other embodiments, two or more of the diced IVRs can be arranged in parallel to form an IVR group, thereby providing an output current to the same power domain. For example, if the SoC 802 includes three power domains, two of which draws a load current of 1 A and one of which draws a load current of 5 A, then the second diced IVR 806 and the fourth diced IVR 810 can be independently coupled to one of the two power domains drawing a load current of 1 A, and the first diced IVR 804 and the third diced IVR 808 can be collectively coupled to the power domain drawing a load current of 5 A, thereby forming an IVR group.

In some embodiments, a diced IVR can be assigned to a particular power domain of the SoC 802 in real-time. For example, the electronic system 800 can include a power management module 812 that is configured to determine, in substantially real-time, an amount of current drawn by each of the power domains in the SoC 802. If the difference between (1) the maximum output current value of the diced IVR(s) associated with a first power domain and (2) the amount of current drawn by the first power domain is less than a predetermined threshold, then the power management module 812 can be configured to assign an additional diced IVR to the first power domain so that the newly assigned IVRs can provide additional current to the first power domain. This way, the power management module 812 can adapt the amount of current provided to a power domain in real time. In some embodiments, the electronic system 800 can maintain one or more spare unit IVRs so that unit IVRs can be assigned to a power domain in real-time.

In some embodiments, diced IVRs can be placed next to an SoC die in a single package, thereby forming a system in package. FIG. 9 illustrates a single package having an SoC die and diced IVRs in accordance with some embodiments. FIG. 9 includes an SoC die 902, diced IVRs 904-910 in a single package 912. In some embodiments, the diced IVRs 904-910 can be unpackaged, bare dies. If a unit IVR is 1×1 mm, the diced IVR 904 having 3 unit IVRs is 1×3 mm, and the diced IVR 908 having 2 unit IVRs is 2×1 mm. In some embodiments, the package 912 can be a through-hole package, which can include a single in-line package, a dual in-line package (DIP), a ceramic DIP, a glass sealed ceramic DIP, a quadruple in-line package, a skinny DIP, a zig-zag in-line package, a molded DIP, or a plastic DIP. In some embodiments, the package 912 can include a surface mount. The surface mount can include a ceramic column grid array (CGA), a column grid array, a ceramic package, a land grid array (LGA), and a multi-chip module (MCM) and chip-scale package (CSP) such as wafer-level chip-scale package (WLCSP). In some embodiments, the package 912 can be a chip carrier. A chip carrier can include a rectangular package with electric contacts on all four edges of the package. The chip carrier can include a bump chip carrier (BCC), a ceramic leadless chip carrier (CLCC), a dual lead-less chip carrier (DLCC), and a plastic leaded chip carrier (PLCC). In some embodiments, the package 912 can include pin grid arrays. The pin grid arrays can include an organic pin grid array (OPGA), a flip-chip pin grid array (FCPGA), a pin array cartridge (PAC), a pin grid array (PGA), and a ceramic pin grid array (CPGA). In some embodiments, the package 912 can include ball grid arrays. A ball grid array can include a fine pitch ball grid array (FBGA), a ceramic ball grid array (CBGA), a plastic ball grid array (PBGA), and a thin ball grid array (TBGA).

In some embodiments, diced IVRs can be placed next to an SoC package on a printed circuit board. FIG. 10 illustrates a printed circuit board having an SoC package and diced IVRs in accordance with some embodiments. FIG. 10 includes an SoC package 1002 and diced IVRs 1004-1010 on a printed circuit board 1012. In some embodiments, the diced IVRs 1004-1010 can be in separate packages. For example, the top IVR package 1004 can include 3 unit IVR dies and the left IVR package 1008 can include 2 unit IVR dies.

In some embodiments, a SoC can send a voltage request to a diced IVR, requesting the diced IVR to provide a particular voltage. The SoC can also provide, to the diced IVR, a feedback signal indicating what voltage is actually being delivered by the diced IVR to the SoC. FIG. 11 illustrates communication between an SoC and one or more diced IVRs in accordance with some embodiments. FIG. 11 includes an SoC package 912 having an SoC 902, and two IVR groups 904, 909. The SoC 902 can send a voltage request to an IVR group 904, 906 to indicate the desired voltage. The voltage request can be sent via a communication channel 1102, 1104 using a variety of communication protocols, including one of I2C, PMBus, or SPI. The SoC 902 can also send a feedback signal to the IVR group to indicate what voltage is currently being delivered by the IVR group 904, 906 to the SoC 902. In some cases, the SoC 902 can send the feedback signal using a VSENSE pin, as indicated in FIG. 11.

Subsequently, the IVR group can use the voltage request and the feedback signal to determine whether the IVR group is providing an appropriate voltage to the SoC. If the IVR group is not providing an appropriate voltage to the SoC, the IVR group can adjust the output voltage based on the voltage request and the feedback signal. In some embodiments, the voltage request and/or the feedback signal can be an analog signal; in other embodiments, the voltage request and/or the feedback signal can be a digital signal.

Assembling unit voltage regulators can be challenging because it can be difficult to balance the current and voltage delivered by different unit IVRs when IVRs have been subjected to process variations, temperature variations, and voltage variations. Due to, for example, process and temperature variations, two identical unit IVRs can provide a different voltage and current. For example, in an ideal case, the unit IVR 906 should deliver 1 A and the IVR group 904 having three unit IVRs should deliver 3 A. However, due to process and temperature variations, the unit IVRs in the IVR group 904 might be running at a higher frequency compared to the nominal frequency, thereby delivering 3.5 A instead of 3 A. On the other hand, the unit IVR 906 might be running at a lower frequency compared to the nominal frequency, thereby delivering 0.5 A instead of 1 A. Such imbalance in output handling of the IVR units can degrade the overall conversion efficiency and increase power consumption, and also over-stress a specific unit IVR and reduce the lifetime of that unit IVR.

To address these issues, the SoC 902 can be configured to receive information on an amount of current being provided by a unit IVR or an IVR group. The information on the amount of current being provided by a unit IVR or an IVR group can include an operating information of a unit IVR or an IVR group. In some embodiments, the operating information can include information on a unit IVR's or an IVR group's operating condition. The operating condition can include one or more of: (1) a frequency at which the switches in the IVR is switching (also referred to as a switching frequency), (2) a proportion of an amount of time during which a current sourcing switch is turned on compared to an amount of time during which a current drain switch is turned on (also referred to as a duty cycle), and (3) an operating temperature of the IVR, measured using, for example, a temperature sensor. In some cases, the operating information can also include one or more of: (1) information on whether power switches are skipping any power conversion cycle (also known as pulse-skipping), and (2) a value of a current output by the IVR, which can be determined by a current sensor. The current sensor can be implemented using a series resistor or other less power-hungry methods (e.g., use current mirroring to reduce current to, for example, $\frac{1}{100}$ and then measure the smaller current value using a series resistor). The unit IVR or the IVR group can provide the operating information to the SoC 902 via a communication channel 1102, 1104.

Once the SoC 902 receives the operating information of a unit IVR or an IVR group, the SoC 902 can be configured to balance the unit IVRs or IVR groups by sending adjustment commands to one or more of the unit IVRs or IVR groups, indicating that the one or more of the unit IVRs or the IVR groups should adjust their operation parameter to adjust the amount of current delivered to the SoC 902. The operation parameter can include, for example, the IVR's switching frequency, duty cycle, and/or pulse skipping operation.

For example, when IVR groups send their switching frequency information to the SoC 902 using communication channels 1102, 1104, the SoC 902 can compare the switching frequency of the IVR groups to determine whether any one of them is delivering too much current by running too fast or whether any one of them is delivering too little current by running too slow. If any one of the unit IVRs is running too fast or to slow, the SoC 902 can send an adjustment command to implicated IVR groups to correspondingly increase or decrease their switching frequency. In some embodiments, the adjustment commands can be broadcasted to all unit IVRs and IVR groups; in other embodiments, the adjustment commands can be sent independently to individual unit IVRs or IVR groups.

In some embodiments, an IVR group can comprise unit IVRs that were physically close to one another on a wafer. Due to characteristics of lithography techniques, unit IVRs that were physically proximate to one another on a wafer tend to exhibit less process variations. For example, adjacent unit IVRs exhibit less process variations compared to IVRs that are physically far apart on the wafer. Therefore, to reduce process variations between unit IVRs, an IVR group can comprise unit IVRs that were physically proximate to one another on the wafer. For example, the unit IVRs in the IVR group 904 can be selected from unit IVRs that were physically close to one another on the wafer. In some cases, the IVR groups coupled to the same SoC 902 can comprise unit IVRs that were physically close to one another on a wafer so that the process variations between the IVR groups is mitigated. For example, the IVR groups 904, 906 can comprise unit IVRs that were physically close to one another on a wafer.

FIG. 12 illustrates communication between an SoC and IVR groups packaged in independent packages in accordance with some embodiments. The IVR group packages 1004, 1006 can be placed next to an SoC package 1002 on a PCB 1012. The IVR group packages 1004, 1006 can communicate with the SoC package 1002 via channels 1204, 1206. The channels 1204, 1206 can accommodate a variety of communication protocols, including one of I2C, PMBus, or SPI. The communication operation of the system in 1012 is substantially similar to a communication operation of the system in 912.

Figure 13:
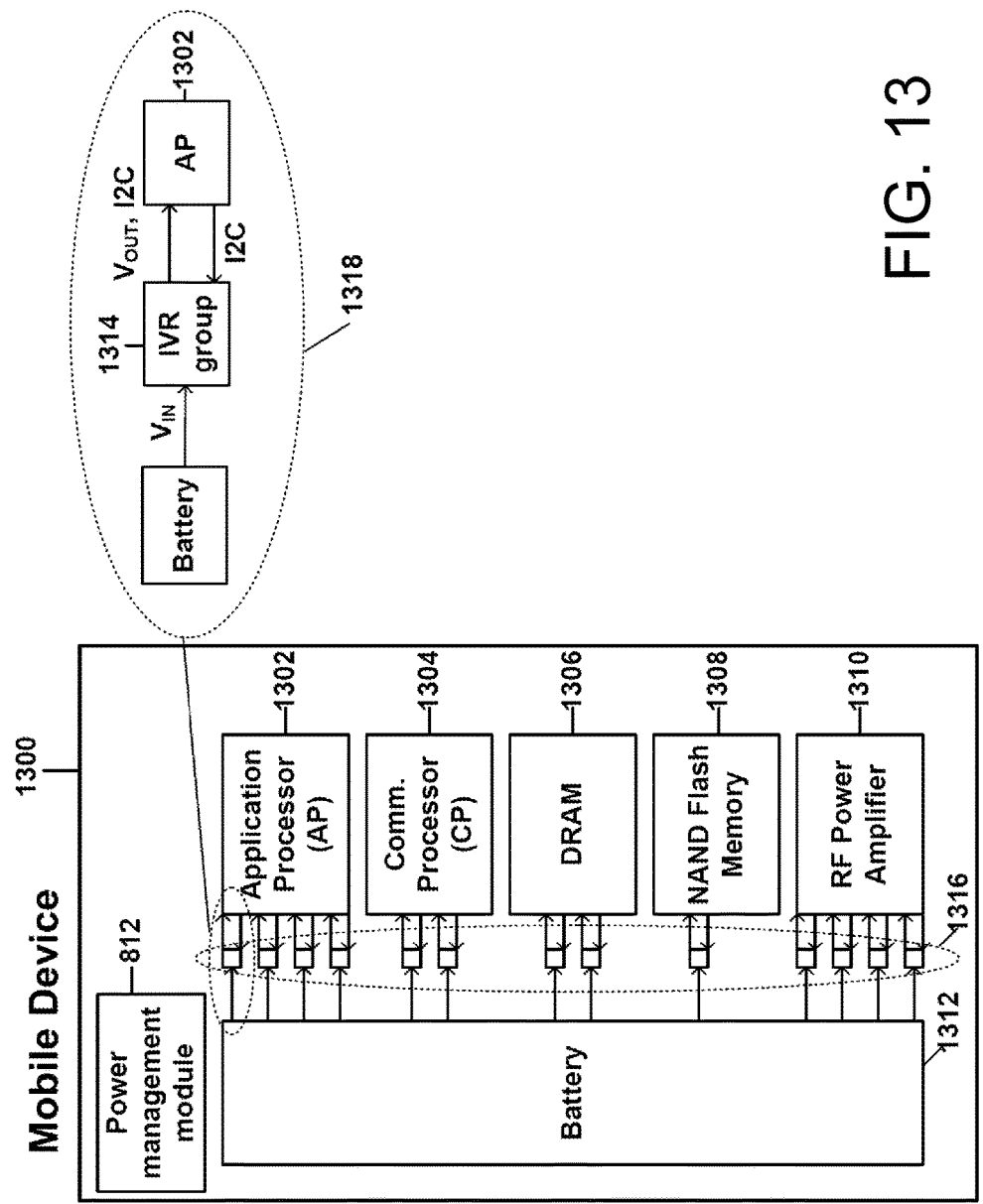
FIG. 13 illustrates a mobile device having unit IVRs in accordance with some embodiments.

FIG. 13 illustrates a mobile device 1300 using unit IVRs in accordance with some embodiments. The electronic device 1300 includes various integrated circuit chips, including, for example, an application processor (AP) 1302, a communication processor (CP) 1304, dynamic random access memory (DRAM) 1306, flash memory 1308, and a radio frequency (RF) power amplifier 1310. The chips 1302-1310 in the electronic device 1300 can receive a source voltage from IVR groups 1316 that convert a voltage from a battery 1312 to voltages used by the chips 1302-1310.

In some embodiments, depending on the number of power domains and current drawn by each power domain, an IVR group can include one or more unit IVRs. For example, an AP 1302 can use an IVR group having four unit IVRs because the AP 1302 consumes a large amount of current, while a CP 1304 can use an IVR group having two unit IVRs because the CP 1304 can consume little current.

As illustrated in the zoom-in sub-FIG. 1318, an IVR group 1314 can receive a battery voltage ($V_{IN}$) and convert it to an output voltage ($V_{OUT}$) that the load chip (in this case, an AP 1302) can use. As discussed above, the IVR group 1314 can communicate with the load chip using communication protocols, such as I2C, SPI or PMBus, so that the IVR group 1314 can deliver the correct $V_{OUT}$ to the load chip 1302.

In some embodiments, a unit IVR or an IVR group may only include three terminals: an input voltage terminal, an output voltage terminal, and a ground terminal. Instead of allocating one or more terminals for communication control signals, such a unit IVR or an IVR group can communicate control signals with other devices via the input voltage terminal or the output voltage terminal by overlaying small, low-swing digital signals on the input or output voltages.

Figure 14A:
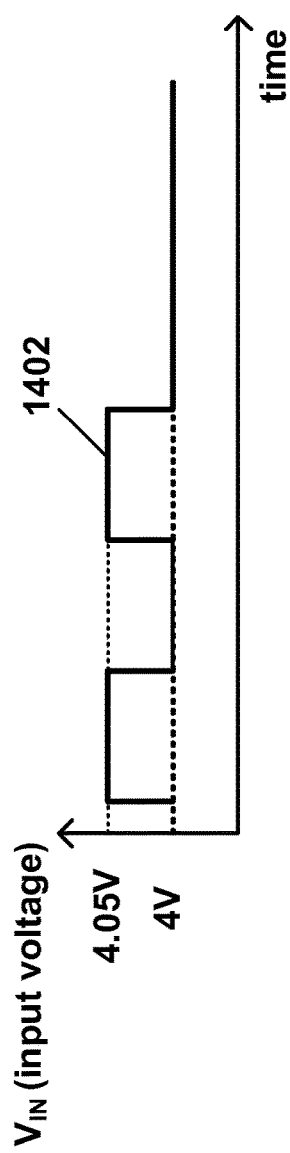
FIGS. 14A-14B illustrate a communication of control signals via an input voltage terminal or an output voltage terminal of an IVR in accordance with some embodiments.
Figure 14B:
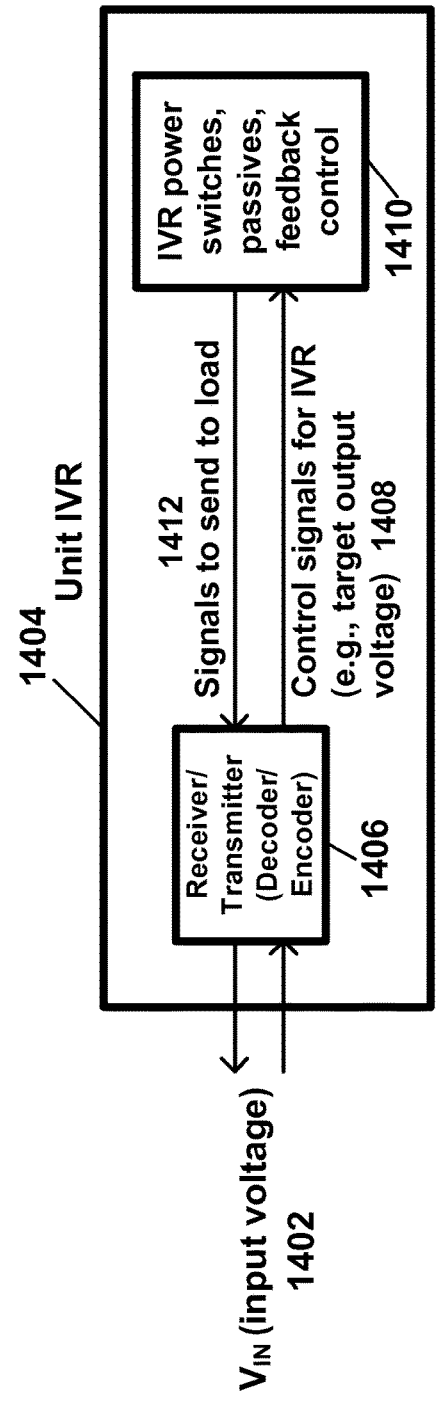

FIGS. 14A-14B illustrate a communication of control signals via an input voltage terminal or an output voltage terminal of an IVR in accordance with some embodiments. FIG. 14A illustrates an input voltage 1402 waveform with a DC input voltage of 4V. The DC input voltage is overlaid by a digital control signal with a small voltage swing, such as 50 mV. FIG. 14B illustrates a unit IVR containing a receiver/transmitter (or decoder/encoder) circuit 1406 that receives or transmits the digital control signal through the input voltage terminal 1402. The digital control signal can be encoded by adjusting the frequency of the signal and/or the pulse-width of the signal. Using this method, the unit IVR can remove multiple pins commonly dedicated for communications using protocols such as I²C, PMBus, SPI and communicate over the input voltage terminal 1402, or similarly, an output voltage terminal (not shown.) Between the input and output voltage terminals, the one with the higher DC voltage (e.g., the input voltage terminal in a step-down IVR; an output voltage terminal in a step-up IVR) is more suitable to overlay the digital control signal because the higher DC voltage value is less vulnerable to noise introduced by the digital control signal. For example, 50 mV noise on 5V is only 1% noise, while 50 mV on 1V is 5% noise.

In a conventional electronic device, integrated circuit chips have a large number of on-PCB decoupling capacitors placed next to them in order to filter out noise from the voltage supply. On-PCB decoupling capacitors tend to be bulky, so they consume a large area/volume in the electronic device. Furthermore, a number of decoupling capacitors coupled to a chip can be roughly proportional to an amount of current drawn by the chip. Thus, the area/volume consumed by the on-PCB decoupling capacitors is large.

In some embodiments, IVR groups 1316 can replace on-PCB decoupling capacitors in an electronic system, such as an electronic device 1300. In particular, the IVR groups 1316 can be a physical replacement of on-PCB decoupling capacitors in that the IVR groups 1316 can be arranged the same way as the on-PCB decoupling capacitors. This is advantageous for at least two reasons. First, because IVR groups 1316 can be smaller than a decoupling capacitor, the area overhead of using on-PCB decoupling capacitors can be reduced. Second, on-PCB decoupling capacitors only provides passive voltage regulation, whereas the IVR groups 1316 can provide active voltage regulation, thereby providing a regulated, low-noise voltage to a load chip. Therefore, the IVR groups can provide a better voltage regulation and a reduction of a PCB area without significantly modifying the PCB design.

In some embodiments, the electronic device 1300 can include a power management module 812. The power management module 812 can be configured to dynamically assign IVR groups to one of the load chips in the electronic device 1302-1310. For example, when an amount of current consumed by an AP 1302 is reaching a maximum current that can be provided by an IVR group assigned to the AP 1302, then the power management 812 can assign an additional IVR group or an additional unit IVR to the AP 1302 so that the AP's operation is not disturbed. In other embodiments, when an amount of current consumed by an AP 1302 is well-below a maximum current that can be provided by an IVR group assigned to the AP 1302, then the power management module 812 can assign one or more unit IVRs in that IVR group to another chip, such as a CP 1304. The assignment of unit IVRs can be performed by reconfiguring electrical connections between unit IVRs and the chips. The reconfiguration of electrical connections can be performed using a switch matrix, similar to the ones used in a field programmable logic array (FPGA). By dynamically allocating IVR groups to a wide variety of load chips, the mobile device designer does not have to over-provision the total number of IVR groups. For example, suppose that the AP 1302 uses 5 IVR groups when operating at the maximum current and the CP 1304 uses 3 IVR groups when operating at the maximum current. If it is highly unlikely that both the AP 1302 and CP 1304 operate at the maximum current at the same time, the mobile device designer can allocate, for example, 6 instead of 8 IVR groups for the AP 1302 and CP 1304 together.

In some embodiments, the power management module 812 can be implemented as a software application running on a processor. The software application can be stored in memory. The memory can be a non-transitory computer readable medium, flash memory, a magnetic disk drive, an optical drive, a programmable read-only memory (PROM), a read-only memory (ROM), or any other memory or combination of memories. The software can run on a processor capable of executing computer instructions or computer code. The processor might also be implemented in hardware using an application specific integrated circuit (ASIC), programmable logic array (PLA), field programmable gate array (FPGA), or any other integrated circuit. In some embodiments, the power management module 812 itself can be implemented in hardware using an application specific integrated circuit (ASIC), programmable logic array (PLA), field programmable gate array (FPGA), or any other integrated circuit. For example, the power management module 812 can be synthesized using hardware programming languages including Verilog, VHDL, and Bluespec. In some embodiments, the power management module can be a circuit block integrated inside the SoC die or in individual unit IVR dies.

The electronic device 1300 can include a cellular device, including user equipment. The user equipment communicates with one or more radio access networks and/or with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment can also be a wearable computing device, such as a wearable watch, a wearable pendant, or any other type of computing device that can be carried around easily. The user equipment operates using an operating system such as Symbian OS, iPhone OS, RIM's Blackberry, Windows Mobile, Linux, HP WebOS, Tizen, and Android. The screen might be a touch screen that is used to input data to the mobile device, in which case the screen can be used instead of the full keyboard. The user equipment can also keep global positioning coordinates, profile information, or other location information.

The electronic device 1300 also includes any platforms capable of computations and communication. Non-limiting examples can include televisions (TVs), video projectors, set-top boxes or set-top units, digital video recorders (DVR), computers, netbooks, laptops, and any other audio/visual equipment with computation capabilities. The computing device 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The electronic device 1300 can also provide a variety of user interfaces such as a keyboard, a touch screen, a trackball, a touch pad, and/or a mouse. The electronic device 1300 may also include speakers and a display device in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, apparatus, systems, and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A voltage regulator comprising:
   an input voltage terminal;
   an output voltage terminal;
   a ground terminal; and
   a plurality of unit integrated voltage regulators (IVRs), wherein each of the plurality of unit IVRs comprises an IVR input voltage terminal, an IVR output voltage terminal, and an IVR ground terminal, wherein each of the plurality of unit IVRs is integrated on a unique die, and where in at least two of the plurality of unit IVRs are integrated on adjacent dies of a single wafer that are physically coupled to one another;
   wherein the input voltage terminal of each of the plurality of unit IVRs is electrically connected to the input voltage terminal of the voltage regulator,
   wherein the output voltage terminal of each of the plurality of unit IVRs is electrically connected to the output voltage terminal of the voltage regulator,
   wherein the ground terminal of each of the plurality of unit IVRs is electrically connected to the ground terminal of the voltage regulator; and
   wherein each of the plurality of unit IVRs has substantially identical performance characteristics.

2. The voltage regulator of claim 1, wherein each of the plurality of unit IVRs is configured to receive an identical control signal, thereby operating in parallel to one another.

3. The voltage regulator of claim 1, wherein the plurality of unit IVRs is configured to receive a time-staggered control signal, thereby operating in a poly-phase operation mode.

4. The voltage regulator of claim 1, wherein each of the plurality of unit IVRs is configured to receive a control signal that is not synchronized with one another, thereby operating independently.

5. The voltage regulator of claim 2, wherein the control signal comprises a low-swing digital signal overlaid on a signal line coupled to the input voltage terminal.

6. The voltage regulator of claim 2, wherein the control signal comprises a low-swing digital signal overlaid on a signal line coupled to the output voltage terminal.

7. The voltage regulator of claim 1, wherein the plurality of unit IVRs are embodied on a plurality of dies packaged in a single package.

8. The voltage regulator of claim 1, wherein the plurality of unit IVRs are embodied in a plurality of packages coupled via a printed circuit board.

9. An electronic system comprising:
   a load chip comprising a first power domain, wherein the first power domain comprises a input voltage terminal and a ground terminal;
   a first voltage regulator according to claim 1, wherein the first voltage regulator comprises an input voltage terminal, an output voltage terminal, and a ground terminal, wherein the output voltage terminal of the first voltage regulator is electrically coupled to the input voltage terminal of the first power domain, and wherein the ground terminal of the first voltage regulator is electrically connected to the ground terminal of the first power domain.

10. The electronic system of claim 9,
    wherein the load chip comprises a second power domain, wherein the second power domain comprises an input voltage terminal and a ground terminal;

wherein the electronic system further comprises a second voltage regulator, wherein the second voltage regulator comprises an input voltage terminal, an output voltage terminal, and a ground terminal, wherein the output voltage terminal of the second voltage regulator is electrically coupled to the input voltage terminal of the second power domain, and wherein the ground terminal of the second voltage regulator is electrically connected to the ground terminal of the second power domain.

11. The electronic system of claim 9, wherein the first voltage regulator and the second voltage regulator are configured to provide, to the load chip, operating information associated with the first voltage regulator and the second voltage regulator, respectively.

12. The electronic system of claim 11, wherein the first voltage regulator is configured to receive, from the load chip, an adjustment command, requesting the first voltage regulator to adjust its operation.

13. The electronic system of claim 11, wherein the operating information of the first voltage regulator comprises a switching frequency information of the first voltage regulator.

14. The electronic system of claim 9, wherein the load chip is configured to receive, from the first voltage regulator and the second voltage regulator, operating information associated with the first voltage regulator and the second voltage regulator, respectively, and determine whether one of the first voltage regulator or the second voltage regulator is operating at a frequency higher than a nominal frequency.

15. The electronic system of claim 14, wherein, when the first voltage regulator is operating at a frequency higher than a nominal frequency, the load chip is configured to provide an adjustment command, to the first voltage regulator, to cause the first voltage regulator to reduce its operating frequency.

16. The electronic system of claim 10, further comprising:
a third voltage regulator; and
a power management module configured to determine an amount of current drawn by the first power domain, and is further configured to cause the third voltage regulator to provide current to the first power domain.

17. The electronic system of claim 16, further comprising a switch matrix coupled to the first voltage regulator and the third voltage regulator, and wherein the power management module is configured to cause the switch matrix to couple the third voltage regulator to the first power domain.

18. The electronic system of claim 9, wherein the electronic system comprises one of a smart phone, a wearable computing device, or a tablet computer.

19. An apparatus for providing a voltage regulator, the apparatus configured to:
determine an amount of output current to be provided by the voltage regulator;
determine a number of unit integrated voltage regulators (IVRs) for providing the amount of output current, wherein each of the unit IVRs is configured to operate independently to provide an amount of current within a predetermined range;
select the number of unit IVRs for the voltage regulator; and
arrange the selected unit IVRs in parallel to provide the voltage regulator,
wherein the apparatus is configured to arrange the selected unit IVRs by cutting a portion of a wafer comprising the number of unit IVRs.

20. The apparatus of claim 19, wherein the apparatus is configured to select the number of unit IVRs that are in close proximity to one another on a wafer.

* * * * *